United States Patent [19]
Greenwood

[11] Patent Number: 5,712,620
[45] Date of Patent: Jan. 27, 1998

[54] GLASS FRACTURE SECURITY SYSTEM AND A RESILIENT SEALING MEANS FOR USE THEREIN

[75] Inventor: Jeremy John Greenwood, Sutton Coldfield, England

[73] Assignee: Rover Group Limited, Warwick, England

[21] Appl. No.: 517,976

[22] Filed: Aug. 22, 1995

[30] Foreign Application Priority Data

Sep. 13, 1994 [GB] United Kingdom ............... 9418402

[51] Int. Cl.⁶ .................................................. G08B 13/00
[52] U.S. Cl. ..................... 340/541; 200/61.41; 200/511; 340/426; 340/565
[58] Field of Search ........................... 340/541, 545, 340/550, 565, 566, 665, 426, 429; 200/61.41, 511

[56] References Cited

U.S. PATENT DOCUMENTS

| | | | |
|---|---|---|---|
| 3,710,050 | 1/1973 | Richards | 200/61.43 |
| 3,815,005 | 6/1974 | Berger | 318/466 |
| 3,830,018 | 8/1974 | Arai et al. | 200/61.43 X |
| 4,230,918 | 10/1980 | Schroeder et al. | 340/545 X |
| 4,628,300 | 12/1986 | Amato | 340/426 X |

FOREIGN PATENT DOCUMENTS

| | | | |
|---|---|---|---|
| 297940 | 1/1989 | European Pat. Off. | 340/550 |
| 0 390 618 | 10/1990 | France . | |
| 39 23 608 | 4/1990 | Germany | 340/426 |
| 93 06 503 | 8/1993 | Germany . | |
| 2 186 408 | 8/1987 | United Kingdom . | |

*Primary Examiner*—Thomas Mullen
*Attorney, Agent, or Firm*—Davis and Bujold

[57] ABSTRACT

A security system for detecting the fracture of a pane of glass of a motor vehicle comprising a fracture detector mechanisms in the form of a resilient sealing member. The resilient sealing member, which is normally in physical contact with the glass, has at least one sensor integrally formed therein by molding the at least one sensor into the resilient sealing member. The electrical state of the at least one each sensor, which is monitored by a control mechanism, is changed when the glass is fractured and, upon fracture, an appropriate warning device is energized by the control mechanism in response thereto. An anti-trap device may also be included in the resilient sealing member in order to detect the presence of foreign objects.

29 Claims, 2 Drawing Sheets

GLASS FRACTURE SECURITY SYSTEM AND A RESILIENT SEALING MEANS FOR USE THEREIN

TECHNICAL FIELD OF THE INVENTION

This invention relates to a security system and in particular to a system for detecting the fracture of a pane of glass.

BACKGROUND OF THE INVENTION

It is a problem when using glass as part of the structure of a building or motor vehicle that the building or vehicle can be illegally entered by breaking the glass.

It is known from DE-3923608-A to provide a security system for detecting the fracture of a pane of glass, the system comprising at least one glass fracture detector means the electrical state of which is altered when the pane of glass is fractured, a control means connected to the or each detector means to sense said change in electrical state and a warning means connected to said control means to provide a warning of the fracture of said pane of glass in response to a signal received from said control means.

It is an object of this invention to provide a simple and inexpensive security system of the glass fracture detection type.

SUMMARY OF THE INVENTION

According to a first aspect of the invention there is provided a security system for detecting the fracture of a pane of glass, the system comprising:

a resilient sealing member used to form a seal between the pane of glass and a surrounding frame;

at least one glass fracture detector means the electrical state of which is altered when the pane of glass is fractured;

a control means connected to the or each detector means to sense said change in electrical state; and a warning means connected to said control means to provide a warning of the fracture of said pane of glass in response to a signal received from said control means wherein the fracture detector means comprises of at least one sensor formed as an integral part of said resilient sealing member.

This has the advantage that no separate mounting or adjustment of the detector means is required.

The or each sensor may be a switch held in a closed conductive state by contact between the pane of glass and the resilient sealing member and changed to an open non-conductive state when a portion of the pane of glass is not in contact with the resilient sealing member.

The or each sensor may be a switch held in an open non-conductive state by contact between the pane of glass and the resilient sealing member and changed to a closed conductive state when a portion of the pane of glass is not in contact with the resilient sealing member.

The or each sensor may be a pressure sensitive device the resistance of which is dependant upon the amount it is compressed by contact with the pane of glass.

The pane of glass may be a moveable side window of a motor vehicle.

The or each sensor may be formed in a passageway within said resilient sealing means.

The or each switch includes two electrical conductors at least one of which is a metal conductor.

Alternatively, the or each switch includes two electrical conductors at least one of which is made from a conductive rubber or elastomer in which case the or each conductor that is made from a conductive rubber or elastomer is formed as an integral part of the resilient sealing means by co-extrusion.

Alternatively, the or each conductor that is made from a conductive rubber or elastomer is formed as an integral part of the resilient sealing means by co-moulding.

The or each metal conductor may be formed as an integral part of the resilient sealing means by being moulded into the resilient sealing means.

According to a second aspect of the invention there is provided a resilient sealing means for use in a security system of the type according to said first aspect of the invention in which the resilient sealing means further includes a second sensor means used to detect the presence of a foreign object between the upper edge of said moveable side window and part of the resilient sealing member.

The second sensor may be a switch having two electrical conductors located in a passageway near to a lower edge of the resilient sealing means.

According to a third aspect of the invention there is provided a resilient sealing member for a power operated sliding side window of a motor vehicle having a first sensor means formed as an integral part of said sealing member to detect, in use, contact between the sealing member and a side face of the window for use as a glass fracture detector and a second sensor means formed as an integral part of said sealing member to detect, in use, the presence of a foreign object trapped between one edge of the sealing member and an upper edge of the window for use as a trap detector in an anti-trap window system.

This has the advantage that detection for glass fracture and entrapment are provided economically in a simple manner as part of the resilient seal.

BRIEF DESCRIPTION OF THE DRAWINGS

The invention will now be described by way of example with reference to the accompanying drawing of which.

DETAILED DESCRIPTION OF THE INVENTION

Figure 1:
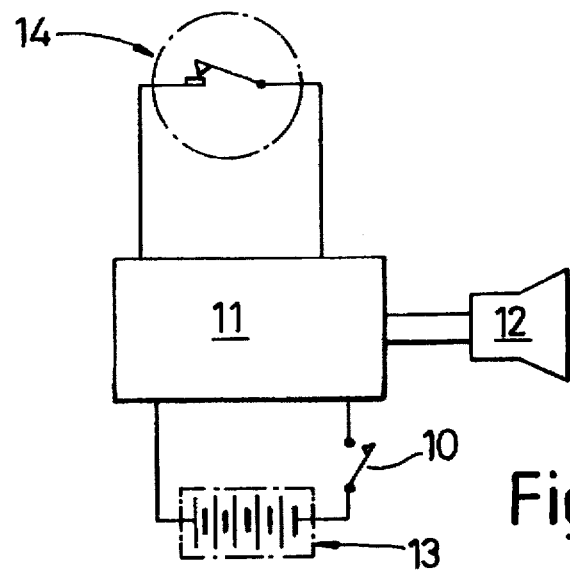
FIG. 1: is a schematic circuit diagram of a security system in accordance with a first aspect of the invention.

With reference to FIG. 1 there is shown a security control means 11 to which is connected a warning means in the form of a siren 12. The security control means is supplied with a source of electric power from a battery 13 connected thereto which is used to activate the siren 12 and also for detecting the fracture of a pane of glass in the form of a window 20 by means of the fracture detector means 14.

The detector means 14 comprises a sensor in the form of a normally open switch formed as part of a resilient sealing means in the form of a U-shaped window seal 16.

The window seal 16 is located in a rigid U-shaped frame member in the form of a door window frame 15 for a motor vehicle and comprises of two limbs defining therebetween a U-shaped groove into which the window 20 can be engaged.

Figure 2:
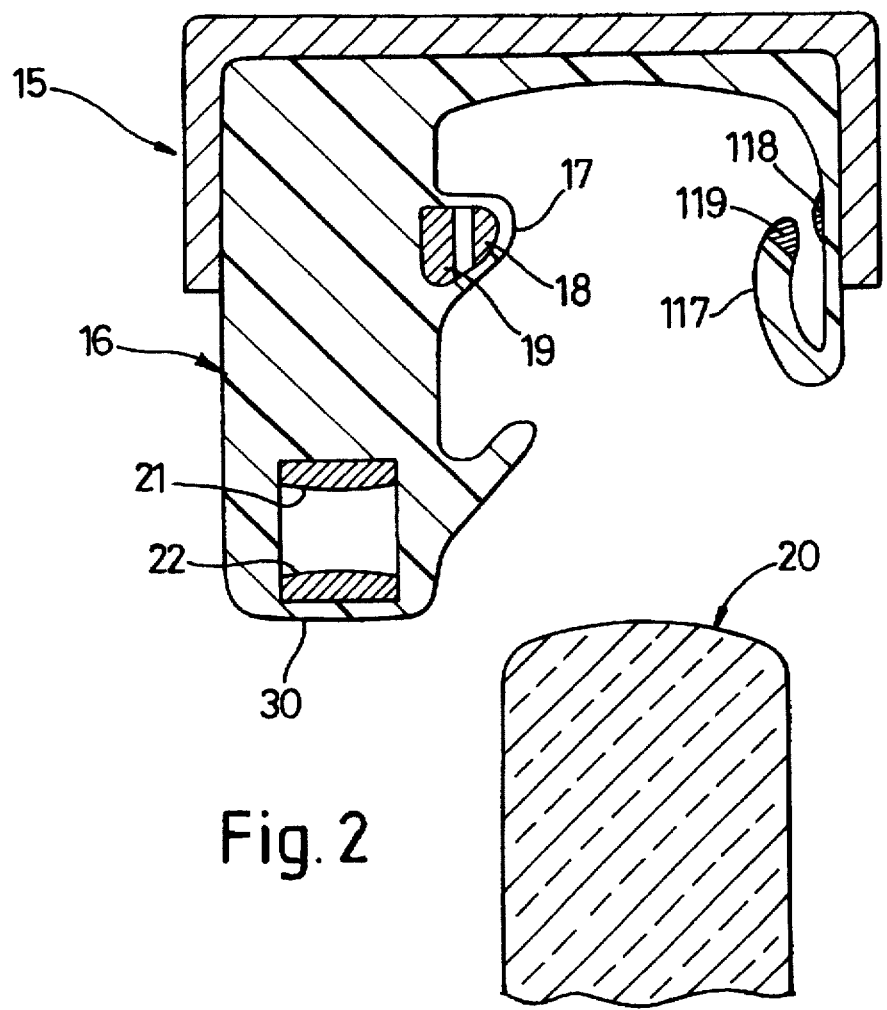
FIG. 2: is a cross-section through a resilient sealing means according to second and third aspects of the Invention showing two embodiments of the Invention.

With reference to FIG. 2 there is shown a first embodiment in which the switch of the detector means 14 is formed by two spaced apart electrical conductors in the form of two metal strips 18, 19 moulded into the seal 16 within a passageway 17 near to the surface of one of the limbs of the window seal 16. The two conductors 18,19 are connected in use to the control means 11 by wiring (not shown).

When the window 20 is slid into the groove in the window seal 16 corresponding to a window closed position, the two switch conductors 18, 19 are pressed together forming an electric circuit through which current from the control means 11 will pass.

If the window 20 is fractured by any means then pieces of broken glass will become disengaged from the groove in the window seal 16 thereby allowing the conductors 18, 19 to separate and return the switch to its normally open position. This change in state of the electrical circuit through the two conductors 18, 19 is sensed by the control means 11 and used as an indication that the window 20 has been fractured. Upon sensing fracture of the window 20 the control means 11 sends a signal to the siren 12 causing the siren 12 to be sounded.

To prevent the siren 12 being activated erroneously, such as when the window 20 is slid down into an open position, a switch 10 is provided to activate the control means 11.

The switch 10 is formed by a set of contacts formed as part of the ignition switch of the motor vehicle and arranged to be switched on only when the ignition switch is in an off position.

In accordance with a second embodiment of the invention the electrical conductors of the fracture detector means are formed from electrically conductive rubber or elastomer and are co-moulded or co-extruded as an integral part of the window seal 16. Such an embodiment is shown in FIG. 2 where a first conductor 118 is formed of an electrically conductive elastomer co-moulded as part of one of the limbs of the window seal 16 and a second electrically conductive member 119 co-moulded as part of a lip 117 extending into the groove in the window seal 16.

The first and second conductors 118, 119 form a switch and act in the same manner as the metal conductor switch 18, 19 described above. The two conductors 118,119 are connected in use to the control means 11 by wiring (not shown).

In addition to the glass fracture detection means 18, 19 the resilient seal 16 is also provided with an anti-trap sensor to detect the presence of a foreign object trapped between the lower edge 30 of the window seal 16 and the upper edge of the window 20.

The anti-trap sensor is formed by a pair of spaced apart electrical conductors 21, 22 located within a cavity near to the free end of one of the limbs of the window seal 16. Each of the conductors 21, 22 extends along substantially the entire length of the portion of the window seal 16 that in use co-operates with the upper edge of the window 20.

Any object placed between the upper edge of the window 20 and the limb will, upon closing of the window 20, cause the two conductors 21, 22 to be brought into contact thereby providing an indication of entrapment which could be utilised in an anti-trap system of the type described in U.S. Pat. No. 3,815,005.

The provision of an anti-trap sensor as part of the detector means 14 is useful when the window seal 16 is used for sealing a power actuated sliding window on a motor vehicle as the detector then provides in a simple and cost effective manner sensors for both window fracture and entrapment.

Figure 3:
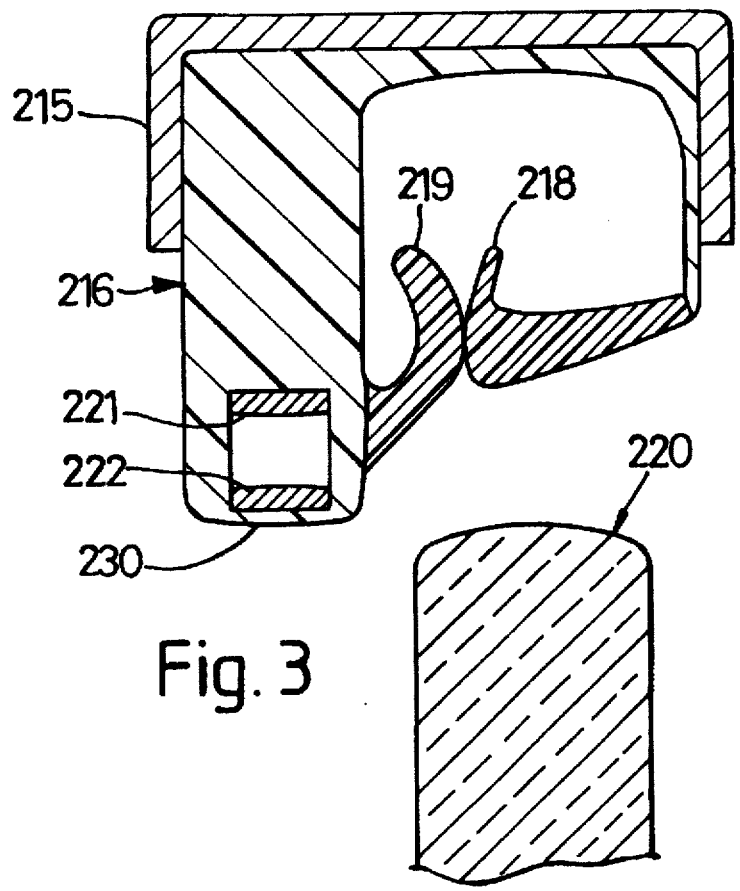
FIG. 3: is a cross-section through a resilient sealing means according to second and third aspects of the Invention showing a third embodiment.

With particular reference to FIG. 3 there is shown a third embodiment in which the resilient sealing means is in the form of a U-shaped window seal 216 located within a window frame 215 and in which the sensor is formed by two conductive limbs 218, 219 which form a normally closed switch and are co-extruded with the rest of the window seal 216. The two conductive limbs 218, 219, formed from electrically conductive materials as described previously, are connected, in use, to the control means 11 by wiring (not shown).

When a window 220 is inserted into a groove in the window seal 216 the limbs 218, 219 are forced apart and the electrical state of the switch is changed from closed to open.

In addition to the glass fracture detection means 218, 219 the resilient seal 216 is also provided with an anti-trap sensor to detect the presence of a foreign object trapped between the lower edge 230 of the window seal 216 and the upper edge of the window 220.

The anti-trap sensor is formed by a pair of spaced apart electrical conductors 221, 222 located within a cavity near to the free end of one of the limbs of the window seal 216.

Each of the conductors 221, 222 extends along substantially the entire length of the portion of the window seal 216 that in use co-operates with the upper edge of the window 220.

Any object placed between the upper edge of the window 220 and the limb will upon closing of the window 220 cause the two conductors 221, 222 to be brought into contact thereby providing an indication of entrapment which could be utilised in an anti-trap system of the type described in U.S. Pat. No. 3,815,005.

Figure 4:
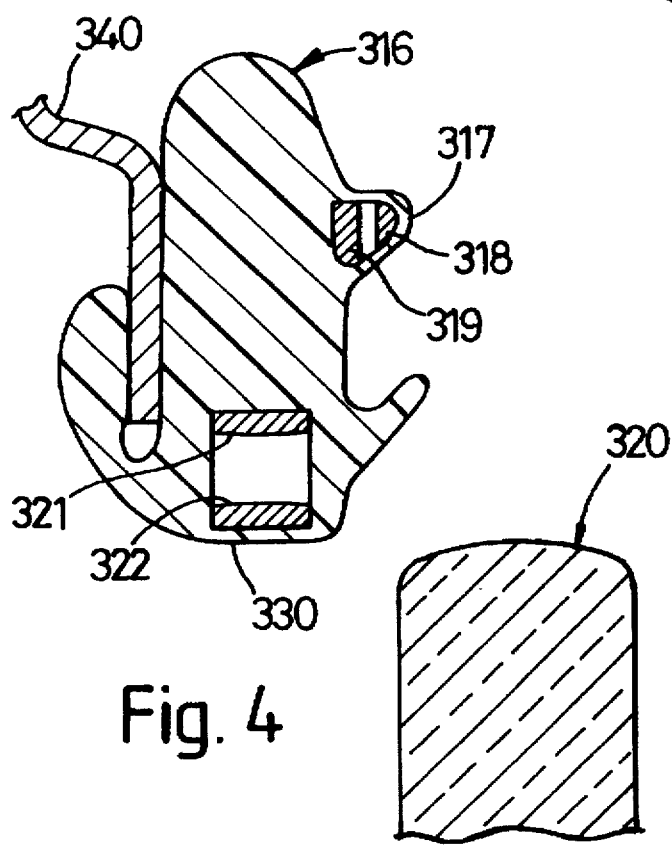
FIG. 4: is a cross-section through a resilient sealing means according to second and third aspects of the Invention showing a fourth embodiment.

As shown in FIG. 4 there is shown a fourth embodiment of the invention that is intended for use with a frameless window structure.

The resilient seal 316 is attached to a lip 340 formed as part of the structure surrounding the window 320 and not within a U-shaped groove. Such a frameless window structure is often used on a motor vehicle in which a window is slidingly supported by a door structure and the seal is attached to part of the vehicle body structure surrounding the door.

In such an application when the door is closed the window 320 is pressed against the resilient seal 316 but when the door is opened there is no contact between the seal 316 and the window 320.

The glass fracture detector is formed by two spaced apart electrical conductors in the form of two metal strips 318, 319 moulded into the seal 16 within a passageway 317 near to the surface of the window seal 316. The two conductors 318, 319 are connected in use to the control means 11 by wiring (not shown).

In addition to the glass fracture detection means 318, 319 the resilient seal 316 is also provided with an anti-trap sensor to detect the presence of a foreign object trapped between the lower edge 330 of the window seal 316 and the upper edge of the window 320.

The anti-trap sensor is formed by a pair of spaced apart electrical conductors 321, 322 located within a cavity near to the free end of a limb forming part of the window seal 316.

Each of the conductors 321, 322 extends along substantially the entire length of the portion of the window seal 316 that in use co-operates with the upper edge of the window 320. Any object placed between the upper edge of the window 320 and the limb will upon closing of the window 320 cause the two conductors 321, 322 to be brought into contact thereby providing an indication of entrapment which could be utilised in an anti-trap system of the type described in U.S. Pat. No. 3,815,005.

It will be appreciated by one skilled in the art that the control means could be a relay or an electronic control unit.

Although the invention has been described by way of example with reference to the use of a single fracture detection switch means there could be provided a number of switch means connected to the control means the switch means being positioned at various places along the window seal. With such an arrangement it is desirable to connect the separate switch means in parallel when the switch means are of the normally open type and in series if of the normally closed type. It will be further appreciated that if a normally open arrangement is used a single switch means could be made to extend around a large part of the periphery of the pane of glass so that fracture at any position would be detected.

It will also be appreciated that the or each sensor used to sense fracture of the window could be a pressure sensitive device in which the resistance varies depending upon the applied pressure, in which case the change of state of the device that occurs upon fracture of the glass is a change in resistance. A pressure sensitive device suitable for such use is disclosed in U.S. Pat. No. 3,710,050-A.

Although the invention has been described with reference to a warning device in the form of a siren other forms of warning device could be used such as a visual warning device in the form of a light emitting diode in which case the fracture detection means could be directly coupled to the diode in which case the output from the or each sensor could be supplied directly to the light emitting diode.

Wherefore, what is claimed is:

1. A security system for detecting the fracture of a pane of glass, the system comprising:

a resilient sealing member used to form a seal between the pane of glass and a surrounding frame;

at least one glass fracture detector means having an electrical state which is changed when the pane of glass is fractured;

a control means connected to the at least one fracture detector means to sense said changed electrical state;

a warning means connected to said control means to provide warning of the fracture of said pane of glass in response to a signal received from said control means wherein the fracture detector means comprises at least one sensor formed as an integral part of said resilient sealing member by one of moulding, co-moulding, and co-extrusion;

the at least one sensor is a switch held in a closed conductive state by contact between the pane of glass and the resilient sealing member and changes to an open non-conductive state when the pane of glass is fractured in the vicinity of a switch; and the switch includes two electrical conductors at least one of which is made from one of a conductive rubber and an elastomer.

2. A security system as claimed in claim 1 in which one of the two electrical conductors is a metal conductor.

3. A security system as claimed in claim 1 in which the resilient sealing member is of a U-shaped cross-section having two limbs defining a groove wherein one of said conductors is formed at or near the end of a lip extending from one of said limbs into said groove and the other of said conductors is formed on an adjacent surface of said limb, the two conductors being pressed into engagement by the pane of glass when said pane is present in the groove.

4. A security system as claimed in claim 1 in which the pane of glass is a moveable side window of a motor vehicle.

5. A security system as claimed in claim 4 in which the resilient sealing member further includes a second sensor means used to detect the presence of a foreign object between the upper edge of said moveable side window and part of the resilient sealing member.

6. A security system as claimed in claim 5 in which the resilient sealing member is of a U-shaped cross-section having two limbs defining a groove.

7. A security system as claimed in claim 6 in which the or each sensor is located in a passageway formed in one of the limbs of said sealing means.

8. A security system as claimed in claim 6 in which the or each sensor of the glass fracture detector is formed by a first conductor formed at or near the end of a lip extending from one of said limbs into said groove and a second conductor formed on an adjacent surface of said limb, the two conductors being pressed into engagement by the pane of glass when said pane is present in the groove.

9. A security system as claimed in claim 5 in which the second sensor means is a switch having two electrical conductors located in a passageway near to a lower edge of the resilient sealing means.

10. A resilient means as claimed in claim 1 in which the sealing means is of a U-shaped cross-section having two limbs defining a groove, and one of said conductors is formed by a first conductive lip extending from one of said limbs into said groove and the other of said conductors is formed by a conductive lip extending from the other of said limbs, the two conductive lips being held apart by the pane of glass when said pane is present in the groove.

11. A security system for detecting the fracture of a pane of glass, the system comprising:

a resilient sealing member used to form a seal between the pane of glass and a surrounding frame;

at least one glass fracture detector means having an electrical state which is changed when the pane of glass is fractured;

a control means connected to the at least one fracture detector means to sense said changed electrical state;

a warning means connected to said control means to provide warning of the fracture of said pane of glass in response to a signal received from said control means wherein the fracture detector means comprises at least one sensor formed as an integral part of said resilient sealing member by one of moulding, co-moudling, and co-extrusion;

the at least one sensor is a switch held in an open non-conductive state by contact between the pane of glass and the resilient sealing member and changes to a closed conductive state when the pane of glass is fractured in the vicinity of a switch; and the switch includes two electrical conductors at least one of which is made from one of a conductive rubber and an elastomer.

12. A security system as claimed in claim 11 in which one of the two electrical conductors is a metal conductor.

13. A security system as claimed in claim 12 in which the metal conductor is formed as an integral part of the resilient sealing means by being moulded into the resilient sealing means.

14. A security system as claimed in claim 11 in which the resilient sealing member is of a U-shaped cross-section having two limbs defining a groove wherein one of said conductors is formed by a first conductive lip extending from one of said limbs into said groove and the other of said conductors is formed by a second conductive lip extending from the other of said limbs, the two conductive lips being held apart by the pane of glass when said pane is present in the groove.

15. A security system as claimed in claim 11 in which the pane of glass is a moveable side window of a motor vehicle.

16. A security system as claimed in claim 15 in which the resilient sealing member further includes a second sensor means used to detect the presence of a foreign object between the upper edge of said moveable side window and part of the resilient sealing member.

17. A security system for use in a security system as claimed in claim 16 in which the resilient sealing means is of a U-shaped cross-section having two limbs defining a groove.

18. A security system as claimed in claim 16 in which the second sensor means is a switch having two electrical conductors located in a passageway near to a lower edge of the resilient sealing means.

19. A resilient sealing means as claimed in claim 11 in which the sealing means is of a U-shaped cross-section having two limbs defining a groove, and one of said conductors is formed by a first conductive lip extending from one of said limbs into said groove and the other of said conductors is formed by a conductive lip extending from the other of said limbs, the two conductive lips being held apart by the pane of glass when said pane is present in the groove.

20. A resilient sealing member for a power operated sliding side window of a motor vehicle having a first sensor means formed as an integral part of said sealing member to detect, in use, contact between the sealing member and a side face of the window for use as a glass fracture detector and a second sensor means formed as an integral part of said sealing member to detect, in use, the presence of a foreign object trapped between one edge of the sealing member and an upper edge of the window for use as a trap detector in an anti-trap window system.

21. A resilient sealing member as claimed in claim 20 in which the first sensor means is a switch having two electrical conductors made from metal both of which are formed as an integral part of the resilient sealing member by being molded into the resilient sealing member.

22. A resilient sealing member as claimed in claim 21 in which the resilient sealing member defines an internal passageway having a wall in which the metal conductors are molded.

23. A resilient sealing member as claimed in claim 20 in which the first sensor means is a switch having two electrical conductors made from a conductive elastomer formed as an integral part of the resilient sealing member by co-molding therewith.

24. A resilient sealing member as claimed in claim 23 in which the resilient sealing member is of a U-shaped cross-section having two limbs defining a groove wherein one of said conductors is formed at or near the end of a lip extending from one of said limbs into said groove and the other of said conductors is formed on an adjacent surface of said limb, the two conductors being pressed into engagement by the window when said window is located within the groove.

25. A resilient sealing member as claimed in claim 20 in which the first sensor means is a switch having two electrical conductors made from a conductive elastomer formed as an integral part of the resilient sealing member by co-extrusion therewith.

26. A resilient sealing member as claimed in claim 25 in which the resilient sealing member is of a U-shaped cross-section having two limbs defining a groove into which the window is engageable, one of said conductors being formed by a first conductive lip extending from one of said limbs into said groove and the other of said conductors being formed by a conductive lip extending from the other of said limbs into the groove, the two conductive lips being held apart by the pane of glass when said pane is located within the groove.

27. A security system for detecting the fracture of a pane of glass, the system comprising:

a resilient sealing member being used to form a seal between the pane of glass and a surrounding frame, the resilient sealing member defining a wall of an internal passageway in which is located at least one glass fracture detector means having an electrical state which is changed when the pane of glass is fractured;

a control means being connected to the at least one detector means to sense said changed electrical state; and a warning means being connected to said control means to provide a warning of the fracture of said pane of glass in response to a signal received from said control means, wherein the at least one detector means comprises at least one switch held in a closed conductive state by contact between the pane of glass and the resilient sealing member and changed to an open non-conductive state when the pane of glass is fractured in the vicinity of the switch, the switch having two metal electrical conductors formed as an integral part of the resilient sealing member by being molded into the wall of the passageway in the resilient sealing member.

28. A security system for detecting the fracture of a pane of glass, the system comprising:

a resilient sealing member being used to form a seal between the pane of glass and a surrounding frame, the resilient sealing member being of a U-shaped cross-section having two limbs defining a groove; at least one glass fracture detector means having an electrical state which is changed when the pane of glass is fractured;

a control means being connected to the at least one detector means to sense said changed electrical state; and a warning means being connected to said control means to provide a warning of the fracture of said pane of glass in response to a signal received from said control means, wherein the at least one detector means comprises a switch held in a closed conductive state by contact between the pane of glass and the resilient sealing member and changed to an open non-conductive state when the pane of glass is fractured in the vicinity of the switch, the switch being formed by two conductors one of which is formed at or near the end of a lip extending from one of said limbs into said groove and the other of said conductors being formed on an adjacent surface of said limb, the two conductors being pressed into engagement by the pane of glass when said pane is located within the groove and being made from a conductive elastomeric material that is formed as an integral part of the resilient sealing member by being co-molded therewith.

29. A security system for detecting the fracture of a pane of glass, the system comprising:

a resilient sealing member being used to form a seal between the pane of glass and a surrounding frame, the resilient sealing member being of U-shaped cross-section having two limbs defining a groove, a first conductive lip extending from one of said limbs into said groove and a second conductive lip extending from the other of said limbs into the groove, the two conductive lips being held apart by the pane of glass when said pane is located within the groove, the two conductive lips forming a switch having an electrical state which is changed when the pane of glass is fractured;

a control means being connected to the switch to sense said changed electrical state; and a warning means being connected to said control means to provide a warning of the fracture of said pane of glass in response to a signal received from said control means, the switch being held in an open non-conductive state by contact between the pane of glass and the resilient sealing member and changed to a closed conductive state when the pane of glass is fractured in the vicinity of the switch, wherein the conductive lips are made from a conductive elastomer and are formed as an integral part of the resilient sealing member by being co-extruded therewith.

* * * * *